US011537862B2

United States Patent
Li et al.

(10) Patent No.: US 11,537,862 B2
(45) Date of Patent: Dec. 27, 2022

(54) NEURAL NETWORK PROCESSOR AND CONTROL METHOD OF NEURAL NETWORK PROCESSOR

(71) Applicant: Shenzhen Intellifusion Technologies Co., Ltd., Guangdong (CN)

(72) Inventors: Wei Li, Guangdong (CN); Qingxin Cao, Guangdong (CN); Heguo Wang, Guangdong (CN); LeaHwang Lee, Guangdong (CN); Aijun Li, Guangdong (CN); Ning Chen, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/623,621

(22) PCT Filed: Oct. 27, 2020

(86) PCT No.: PCT/CN2020/124099
§ 371 (c)(1),
(2) Date: Dec. 29, 2021

(87) PCT Pub. No.: WO2021/129116
PCT Pub. Date: Jul. 1, 2021

(65) Prior Publication Data
US 2022/0207341 A1    Jun. 30, 2022

(30) Foreign Application Priority Data

Dec. 27, 2019 (CN) .......................... 201911403452.3

(51) Int. Cl.
*G06N 3/063* (2006.01)
*G06F 9/50* (2006.01)

(52) U.S. Cl.
CPC .......... *G06N 3/063* (2013.01); *G06F 9/5044* (2013.01); *G06F 9/5066* (2013.01)

(58) Field of Classification Search
None
See application file for complete search history.

(56) References Cited

U.S. PATENT DOCUMENTS

2019/0180183 A1 * 6/2019 Diamant .............. G06N 3/0454
2020/0065177 A1 * 2/2020 Li ...................... G06F 13/1663

FOREIGN PATENT DOCUMENTS

CN          108416433 A       8/2018

* cited by examiner

*Primary Examiner* — Eric C Wai

(57) ABSTRACT

A neural network processor and a control method are provided. The neural network processor includes a neural network processor cluster formed by multiple single-core neural network processors and a peripheral module. The peripheral module includes a main control unit and a DMA module. The DMA module is used to convey a first task descriptor to the main control unit. The main control unit is used to: analyze the first task descriptor, determine, according to an analysis result, a subtask to be distributed to each selected processor; modify the first task descriptor to acquire a second task descriptor respectively corresponding to each selected processor; and distribute each second task descriptor to each corresponding selected processor, and activate each selected processor to process the corresponding subtask. The main control unit schedules and manages all of the single-core neural network processors, thereby leveraging operational performance of the neural network processor.

5 Claims, 3 Drawing Sheets

NEURAL NETWORK PROCESSOR AND CONTROL METHOD OF NEURAL NETWORK PROCESSOR

CROSS REFERENCE TO RELATED APPLICATIONS

This application is a national phase entry under 35 U.S.C § 371 of International Application No. PCT/CN2020/124099, filed on Oct. 27, 2020, which claims priority to Chinese Patent Application No. 201911403452.3, filed on Dec. 27, 2019, the entire contents of all of which are incorporated herein by reference.

BACKGROUND

1. Technical Field

The present disclosure generally relates to the field of chips, and especially relates to a neural network processor and a control method of a neural network processor.

2. Description of Related Art

With the rapid development of artificial intelligence technology, computational power requirements of the neural network processor are becoming higher and higher in various application scenarios, so that a single-core neural network processor is difficult to meet current application requirements. In this case, a multi-core neural network processor has appeared, so that overall computational power is greatly improved through performing parallel operation on a plurality of single-core neural network processors. However, ineffective coordination control is occurred between adjacent conventional single-core neural network processors, which easily causes repeated configuration, missing configuration and non-uniform configuration of tasks, and is difficult to fully exert the performance of the multi-core neural network processor.

SUMMARY

The technical problems to be solved: in view of the shortcomings of the related art, the present disclosure relates to a neural network processor and a control method of a neural network processor which can solve the problem that ineffective coordination control between adjacent single-core neural network processors of conventional multi-core neural network processors is occurred, repeated configuration, missing configuration and non-uniform configuration of tasks are easily occurred, and it is difficult to fully exert performances of the multi-core neural network processors.

In a first aspect, a neural network processor according to an embodiment of the present disclosure includes a neural network processor cluster formed by N single-core neural network processors and a peripheral module, wherein N is an integer greater than 1;

the peripheral module including a main control unit and a direct memory access (DMA) module;

the DMA module configured to convey a first task descriptor to the main control unit, and the first task descriptor configured to describe information of a task distributed to the neural network processor;

the main control unit configured to: analyze the first task descriptor, and then determine a subtask distributed to each selected processor according to an analysis result thereof; modify the first task descriptor to obtain a second task descriptor corresponding to each selected processor; configure the second task descriptor to a corresponding selected processor, and starting each selected processor to process a corresponding subtask; and wherein the selected processor is a processor that is selected from the N single-core neural network processors and configured to perform the task, and the second task descriptor is configured to describe information of the subtask distributed to the selected processor.

Furthermore, the peripheral modules further includes a cluster interface, a mailbox module, a bus forwarding module, a program memory and a data memory; wherein the cluster interface is a slave interface of the neural network processor cluster, and provided for an external CPU of the neural network processor cluster to access and configure internal resources of the peripheral module and each single-core neural network processor;

the mailbox module is configured to store configuration information of the single-core neural network processor or the neural network processor cluster, and state information of the single-core neural network processor or the neural network processor cluster during operating the single-core neural network processor or the neural network processor cluster;

the bus forwarding module is a collection and distribution module of an AXI request on a top layer of the neural network processor cluster, and configured to collect the AXI request of each single-core neural network processor and the main control unit on the top layer of the neural network processor cluster, and send the request that have processed to the top layer of a chip;

the program memory configured to store programs of the main control unit; and the data memory configured to store data generated by the main control unit during operating the main control unit.

Furthermore, the single-core neural network processor includes a single-core interface, a single-core mailbox module and a bus module; wherein the single-core interface is a slave interface of the single-core neural network processor, and provided for the external CPU of the neural network processor cluster or the main control unit to access and configure the internal resources of the single-core neural network processor;

the single-core mailbox module is configured to store the configuration information of the single-core neural network processor, and the state information of the single-core neural network processor during operation; and the bus module is an AXI bus of the single-core neural network processor.

Furthermore, the single-core neural network processor further includes a sharing parameter transport module configured to convey sharing parameters from outside the single-core neural network processor into the data memory inside the single-core neural network processor; and wherein the bus forwarding module includes a parameter sharing logic module corresponding to each single-core neural network processor, and configured to determine parameter sharing logics among the single-core neural network processors, and process control thereof;

the parameter sharing logic module including a command cache configured to cache parameter reading commands sent by the single-core neural network processor, and a data cache configured to cache data that is read back by the parameter sharing logic module.

The neural network processor is configured to perform a preset computer program to implement the following steps:

obtaining a first task descriptor, the first task descriptor configured to describe information of a task distributed to the neural network processor;

analyzing the first task descriptor, and then determining subtasks distributed to each selected processor according to an analysis result thereof, wherein the selected processor is a processor that is selected from the N single-core neural network processors and configured to perform the task;

modifying the first task descriptor to obtain a second task descriptor corresponding to each selected processor, the second task descriptor configured to describe information of the subtask distributed to the selected processor; and configuring each second task descriptor to a corresponding selected processor, and starting each selected processor to process a corresponding subtask.

Furthermore, after determining the subtasks distributed to each single-core neural network processor, the method further includes:

selecting one of the selected processors as a main core processor, and taking the other selected processors except the main core processor, as slave core processors;

furthermore, after starting each selected processor to process the corresponding subtask, the method further includes the following steps:

sharing the parameters read by the main core processor to each of the slave core processors.

Furthermore, the step of sharing the parameters read by the main core processor to each of the slave core processors, can include:

if the parameter reading command sent by the main core processor is received, caching the parameter reading command into the command cache corresponding to the main core processor, and setting a flag bit corresponding to the main core processor as a first value; sending the parameter reading command to a bus, after commands preceding the parameter reading command are all sent out;

if the parameter reading command sent by any one of the slave core processors is received, caching the parameter reading command into the command cache corresponding to the slave core processor, and setting a flag bit corresponding to the slave core processor as a second value;

caching the parameter that is read back into the data cache corresponding to the main core processor, and setting the flag bit corresponding to the main core processor as the second value; and when the flag bit corresponding to each selected processor is the second value, reading the parameter from the data cache corresponding to the main core processor, and broadcasting the parameter to each selected processor.

In a second aspect, a control method of a neural network processor according to an embodiment of the present disclosure applied to a multi-core neural network processor, the multi-core neural network processor including N single-core neural network processors, wherein N is an integer greater than 1;

the neural network processor is the multi-core neural network processor, and includes the N single-core neural network processors (NNPs), wherein N is an integer greater than 1, the method can include the following steps:

obtaining a first task descriptor, the first task descriptor configured to describe information of a task distributed to the multi-core neural network processor;

analyzing the first task descriptor, and then determining subtasks distributed to each selected processor according to an analysis result thereof, wherein the selected processor is a processor that is selected from the N single-core neural network processors and configured to perform the task;

modifying the first task descriptor to obtain a second task descriptor corresponding to each selected processor, the second task descriptor configured to describe information of the subtask distributed to the selected processor; and configuring each second task descriptor to a corresponding selected processor, and starting each selected processor to process a corresponding subtask.

Furthermore, the step of modifying the first task descriptor, can include:

if a processing mode indicated in the first task descriptor is a multi-core single-batch mode, modifying a first fragment information address of the first task descriptor to a second fragment information address, wherein the first fragment information address is an address of fragment information of the multi-core neural network processor, and the second fragment information address is an address of fragment information of the selected processor.

Furthermore, before modifying the first fragment information address of the first task descriptor to the second fragment information address, the method further can include:

obtaining a feature map to be processed, and segmenting the feature map, to obtain each fragment of the feature map;

performing fragment distribution according to the number of the selected processors, and determining fragment information of each selected processor; and storing the fragment information of each selected processor to a specified address.

Furthermore, the step of modifying the first task descriptor, further can include:

if the processing mode indicated in the first task descriptor is a multi-core multi-batch mode, modifying a first input data address of the first task descriptor to a second input data address, wherein the first input data address is a cache address of input data of the multi-core neural network processor, and the second input data address is a cache address of input data of the selected processor; and modifying a first output data address of the first task descriptor to a second output data address, wherein the first output data address is a cache address of output data of the multi-core neural network processor, and the second output data address is a cache address of output data of the selected processor.

Furthermore, after determining the subtasks distributed to each of the single-core neural network processors, the method further includes:

selecting one of the selected processors as a main core processor, and taking the other selected processors except the main core processor, as slave core processors;

after starting each selected processor to process the corresponding subtask, the method further includes the following steps:

sharing the parameters read by the main core processor to each of the slave core processors.

Furthermore, the step of sharing the parameters read by the main core processor to each of the slave core processors, can include:

if a parameter reading command sent by the main core processor is received, caching the parameter reading command into a command cache corresponding to the main core processor, and setting a flag bit corresponding to the main core processor as a first value; sending the parameter reading command to a bus, after commands preceding the parameter reading command are all sent out;

if a parameter reading command sent by any slave core processor is received, caching the parameter reading command into a command cache corresponding to the slave core processor, and setting a flag bit corresponding to the slave core processor as a second value;

caching the parameter that is read back into a data cache corresponding to the main core processor, and setting a flag bit corresponding to the main core processor as the second value; and when the flag bit corresponding to each selected processor is the second value, reading the parameter from the data cache corresponding to the main core processor, and broadcasting the parameter to each selected processor.

Furthermore, the step of obtaining the first task descriptor, can include:

conveying a main control program to the program memory of the main control unit through the DMA module;

starting the main control unit to perform the main control program;

receiving a task notification from a task manager through a task interface; and configuring the DMA module according to the task notification, and conveying the first task descriptor in a specified address to the data memory of the main control unit through the DMA module.

In a third aspect, a computer readable storage medium according to an embodiment of the present disclosure is configured to store computer programs performed by a processor to implement steps of the above control method of any neural network processor.

In a fourth aspect, a terminal device according to an embodiment of the present disclosure includes any one of the above neural network processors.

In a fifth aspect, a computer program product according to an embodiment of the present disclosure is configured to be performed by a neural network processor to implement steps of the above control method of any neural network processor.

The present disclosure provides the advantages as below: the main control unit of the present disclosure is configured to perform effective coordination control on each single-core neural network processor, integrally receive information (namely, the first task descriptor) of the task to be processed that is sent from the DMA module, perform uniform analysis and task distribution on the information, to obtain information of each subtask (i.e. the second task descriptor), and then configure the information of these subtasks to corresponding single-core neural network processors for processing. In this way, the main control unit performs unified scheduling and management on each single-core neural network processor, so that repeated configuration, missing configuration and non-uniform configuration of tasks can be avoided, to fully exert computational performance of the multi-core neural network processor.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Figure 1:
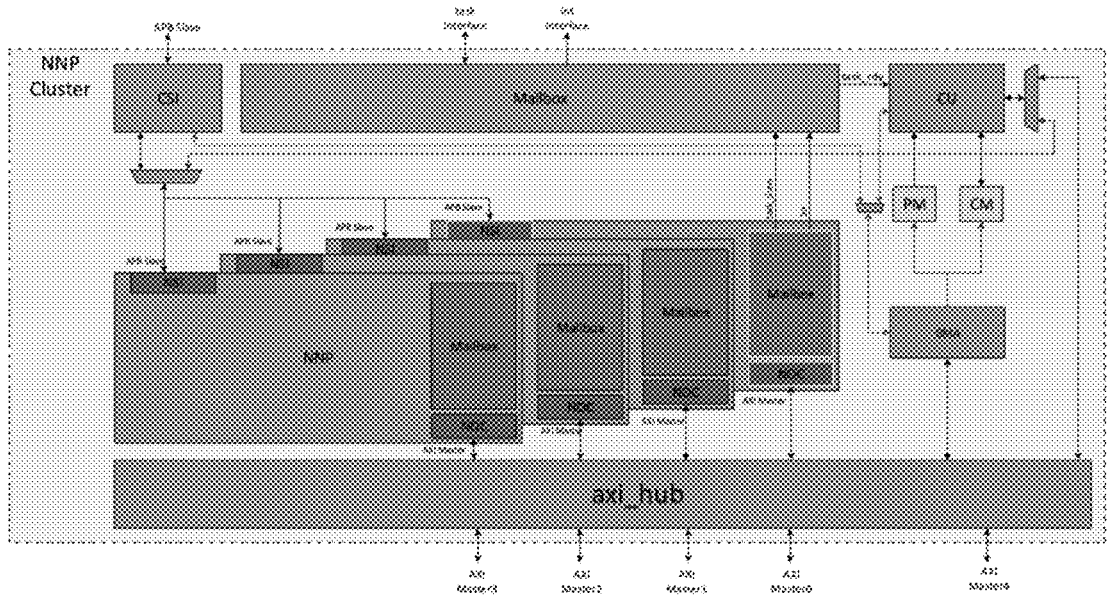
FIG. 1 is a schematic diagram of a neural network processor according to an embodiment of the present disclosure.

FIG. 1 is a schematic diagram of a neural network processor according to an embodiment of the present disclosure. The neural network processor is a multi-core neural network processor including N single-core Neural Network Processors (NNPs), wherein N is an integer greater than 1. The multi-core neural network processor can be regarded as a neural network processor cluster (NNP cluster) formed by the N single-core neural network processors and some peripheral modules.

Four single-core neural network processors (that is, N=4) are shown in FIG. 1, but it should be noted that FIG. 1 is merely an example, rather than a specific qualification. In actual applications, the multi-core neural network processor can include more or fewer single-core neural network processors.

Taking any one of the single-core neural network processors as an example, the single-core neural network processor is mainly configured to perform calculation on each layer of a convolutional neural network (CNN) model.

The single-core neural network processor can include: a single-core interface (NSI), a single-core mailbox module (Mailbox), and a bus module (NOC).

The single-core interface is a slave (slave) interface of the single-core neural network processor, which is provided for an external central processing unit (CPU) of the NNP cluster or a main control unit (CU) on a top layer of the NNP cluster to access and configure internal resources of the single-core neural network processor;

the single-core mailbox module is mainly configured to store some configuration information of the single-core neural network processor and some state information during operating the single-core neural network processor; and a bus module is an AXI bus of the single-core neural network processor.

The multi-core neural network processor can further include the peripheral modules such as a cluster interface (CSI), a mailbox module (Mailbox), a bus forwarding module (AXI Hub), the main control unit (CU), a program memory (PM), a data memory (CM), and a DMA.

The cluster interface (CSI) is a slave interface of the NNP cluster, and mainly provided for the external CPU of the NNP cluster to access and configure the peripheral modules of the NNP cluster and internal resources of each neural network processor.

the mailbox module is configured to store configuration information of the single-core neural network processor or the NNP cluster, store state information during operating the single-core neural network processor or the NNP cluster, and complete interaction with a top-layer interrupt controller of a chip and a task manager;

the AXI Hub is a collection and distribution module for an AXI request on a top layer of the NNP cluster, and configured to collect the AXI request from each neural network processor and the main control unit on the top layer of the NNP cluster, send the request that has processed to the top layer of the chip, and can simultaneously implement parameters sharing among a plurality of cores under a multi-core multi-batch (batch) mode and a multi-core single-batch mode, so as to reduce a bandwidth of the chip;

the main control unit is a main control unit on the top layer of the NNP cluster, and configured to perform process control of the NNP cluster, such as task resolution, resources distribution of the neural network processor, and so on. The main control unit can analyze a task according to a task descriptor, and the task descriptor configured to describe information of the task distributed to the multi-core neural network processor;

the program memory is a program memory of the main control unit, and configured to store programs of the main control unit;

the data memory is a data memory of the main control unit, and configured to store data during operating the main control unit;

the DMA is a data conveying unit on the top layer of the NNP cluster, and configured to convey main programs of the main control unit and the task descriptor (i.e. the first task descriptor) of the NNP cluster.

Figure 2:
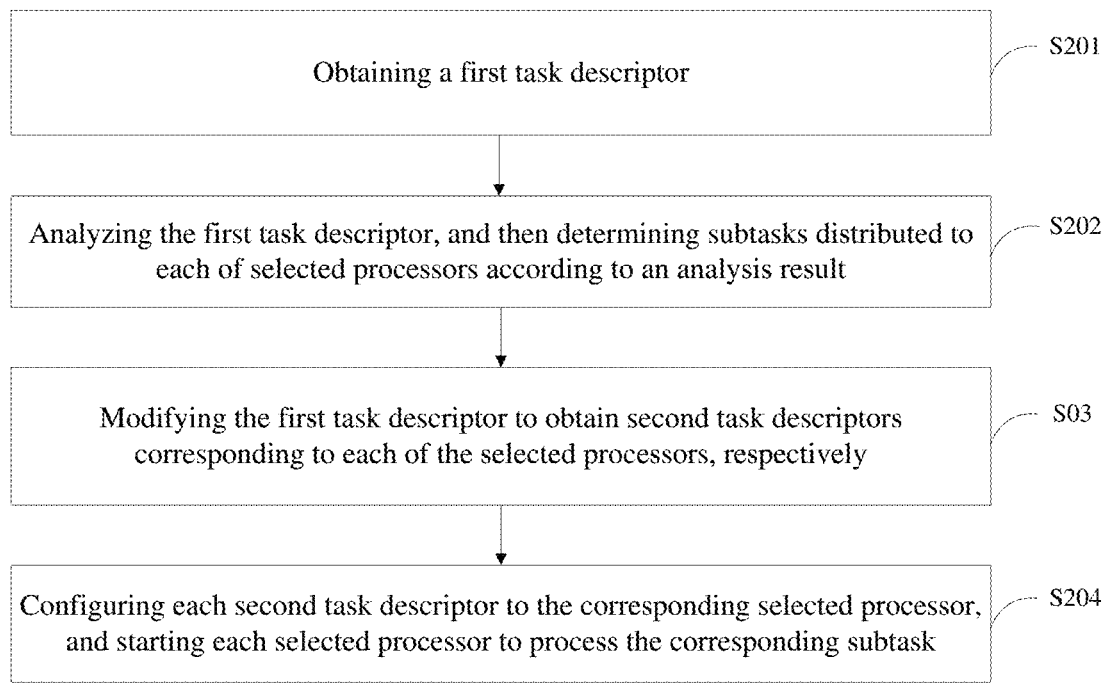
FIG. 2 is a flowchart of a control method of the neural network processor according to an embodiment of the present disclosure.

Referring to FIG. 2, a control method of the neural network processor according to an embodiment of the present disclosure, can include:

step S201, obtaining a first task descriptor.

After the NNP cluster is started, a DMA module inside the NNP cluster is configured through a CPU (central processing unit) on the top layer of the chip, the main control program is transferred from a specified memory (such as a DDR) to the program memory of the main control unit through the DMA module. After the main control program is completely transferred, the main control unit starts to perform the main control program. At this time, the main control unit enters a task waiting state, and other modules of the whole NNP cluster are in a non-working state, except the main control unit and the mailbox module. After initial data of the task is prepared, the CPU on the top layer of the chip configures the number of tasks, upstream and downstream modules of the tasks to the task manager on the top layer of the chip, so that the task of the whole chip can be completely monitored by the task manager.

When a certain task needs to use the NNP cluster, the task manager notifies the NNP cluster through a task interface (task interface) after the upstream module data is ready. After receiving a task notification from the task manager through the task interface, the main control unit can configure the DMA module according to the task notification, and transfer the first task descriptor in the specified address to the data memory of the main control unit through the DMA module, and then the main control unit enters a descriptor resolution stage.

Step S202, analyzing the first task descriptor, and then determining subtasks distributed to each selected processor according to an analysis result thereof.

The selected processor is a processor that is selected from the N single-core neural network processors, and configured to perform the task.

The first task descriptor is configured to describe information of the task distributed to the multi-core neural network processor, and can mainly include field contents as shown in the following table:

TABLE 1

| | |
|---|---|
| task_id | an ID number of a current cluster task, distributed by an upper-layer software |
| batch_size | a batch size of the current cluster task |
| core_num | when the batch_size is 1, using several cores to make the same model |
| task_num_per_batch | the number of subtasks of each batch in the current cluster task |
| tile_info_addr | an address of a tile_info structure |
| tile_info_addr_inc | a length of all tile_info structures in each core |
| data_in_addr | an input data address pointer of a first subtask in the cluster task |
| data_in_addr_inc | an increment of the input data address pointer of adjacent subtasks in the cluster task |
| data_in_buf_depth_per_batch | the number of buffers of input data in each batch |
| data_out_addr | an output data address pointer of the first subtask in the cluster task |
| data_out_addr_inc | an increment of the output data address pointer of adjacent subtasks in the cluster task |
| data_out_buf_depth_per_batch | the number of buffers of output data in each batch |
| num_per_task_int_per_batch | after how many subtasks are completed by each batch, sending out an interrupt |
| num_per_task_done_per_batch | after how many subtasks are completed by each batch, sending out a task_done |
| . . . | . . . |

After obtaining the first task descriptor by the main control unit, the task descriptor needs to be analyzed, it is mainly to analyze the batch_size and the core_num. Information of the two task descriptors are mainly configured to determine the number of NNP cores required by the task. When the batch_size is not equal to 1, the batch_size is the number of cores of the NNPs to be used, and when the batch_size is equal to 1, the core_num is the number of cores of the NNPs to be used. After determining the required number of NNP cores, the main control unit needs to divide resources in combination with a status of each neural network processor in the current NNP cluster, and distribute idle neural network processors to the current task according to a certain distribution principle. If the number of cores of the idle neural network processors is less than the required number of cores of the neural network processors, the main control unit needs to wait until enough cores of the neural network processors are idle before the task distribution of cores of the neural network processors can be performed.

Step S203, modifying the first task descriptor, to obtain a second task descriptor corresponding to each selected processor.

The second task descriptor is configured to describe information of subtasks distributed to the selected processor.

After the task distribution is completed, the main control unit needs to appropriately modify the descriptor (i.e., the first task descriptor) of the NNP cluster, and then the descriptor of the NNP cluster that has modified is converted to the descriptor (i.e., the second task descriptor) of each NNP cluster through the main control unit, and the following information is mainly needed to be modified:

1. A modification for a fragment information address (tile_info_addr) is shown below:

if the processing mode indicated in the first task descriptor is a multi-core single-batch mode (that is, batch size=1 and core num=1), modifying a first fragment information address in the first task descriptor to a second fragment information address. The first fragment information address is an address of fragment information of the multi-core neural network processor, and the second fragment information address is an address of fragment information of the selected processor.

In the multi-core single-batch mode, the fragment information required to be performed by each NNP in the NNP cluster is described in a structure tile_info, each NNP needs to read its own structure tile_info with different starting addresses, so that the fragment information address tile_info_addr in the descriptor of each NNP needs to be modified.

The structure tile_info is generated in advance through a tool chain according to the number of NNP cores needed by the task in a compiling stage, and because a length and a width of the feature map supported by the single NNP are limited, after obtaining the feature map to be processed, it is necessary to segment the feature map, to obtain each fragment of the feature map. And then, performing fragment distribution according to the number of the selected processors, and determining fragment information of each selected processor. After the feature map is segmented into a plurality of fragments, the NNP can respectively perform neural network calculation on the fragments according to the plurality of fragments. The output feature map is finally spliced in the external memory after each fragment is calculated. In this way, different fragments actually correspond to different positions of the same feature map. If the calculation of different fragments is completed by a plurality of cores, an operation of a model can be greatly accelerated.

Figures 3, 4:
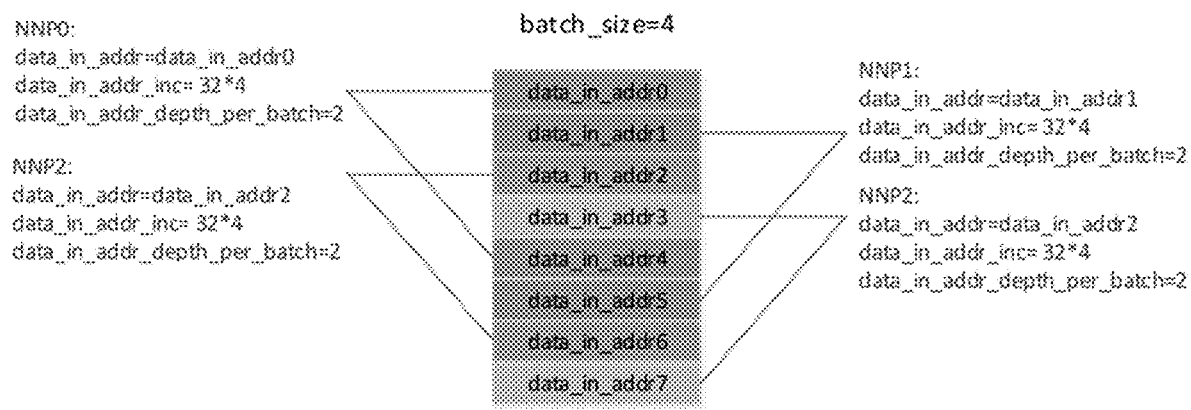
FIG. 3 is a schematic diagram of segmenting a feature map according to an embodiment of the present disclosure.
FIG. 4 is a schematic diagram of caching and distributing data according to an embodiment of the present disclosure.

An example of segmenting the feature map is shown in FIG. 3, and there are at most 9 types of fragments after the feature map is segmented, which are respectively recorded as: tile-tl (that is, a fragment in row 1 and column 1), tile-tr (that is, a fragment in row 1 and the last column), tile-t (that is, fragments in row 1 except the fragments tile-tl and tile-tr), tile-bl (that is, a fragment in the last row and column 1), tile-br (that is, a fragment in the last row and the last column), tile-b (that is, fragments in the last row except the fragments tile-bl and tile-br), tile-l (that is, fragments in column 1 except the fragments tile-tl and tile-bl), tile-r (that is, fragments in the last column except the fragments tile-tr and tile-br), and tile-m (that is, fragments in the feature map except the above 9 types of fragments. There are slight differences among the 9 types of the fragments, such as the length, the width and a padding manner, etc. For example, a width of the fragment tile-m is 106, and a width of the fragment tile-l is 107; no padding are occurred on the top, the bottom, the left, and the right of the fragment tile-m, and the left of the fragment tile-l is performed the padding.

In the compiling stage, the fragments are completely segmented by a compiler of the neural network processor, and different fragments are distributed to different NNP cores, so that the different NNP cores need to be specified by the structure tile_info that is generated by the compiler to perform those fragments. The structure tile_info can mainly include field contents as shown in the following table:

TABLE 2

| tile_pc | for a single NNP core, an entry (program counter) value of the tile program pc |
| --- | --- |
| tile_num | the number of tiles distributed to the single NNP core, the number of tiles distributed to different NNP cores can be different |

TABLE 2-continued

| {tile0_hindex, tile0_vindex} | indexes of tile0 in a horizontal direction and a vertical direction |
| --- | --- |
| {tile1_hindex, tile1_vindex} | indexes of tile1 in a horizontal direction and a vertical direction |
| . . . | . . . |
| {tileN_hindex, tileN_vindex} | indexes of tileN in a horizontal direction and a vertical direction |

After the compilation is completed, fragment information is respectively generated for the NNP cores that have used, and then stored to a predetermined specified address. After the NNPs are started, the NNPs can read their respective fragment information and then perform their corresponding fragments in sequence according to description of their own fragment information. After all fragments of the single NNP are performed, the single NNP needs to be synchronized with other NNPs, so that subsequent operations can be continued until all fragments of all cores have been performed.

The plurality of cores can jointly complete different fragments of the same model, and cooperatively complete a model through the above ways under the multi-core single-batch mode, so that the running time of a single model can be greatly reduced.

2. A modification for an input data address (data_in_addr) and an output address (data_out_addr) is shown in the following:

if the processing mode indicated in the first task descriptor is the multi-core multi-batch mode (that is, batch_size!=1), first input data addresses in the first task descriptor are modified to second input data addresses, respectively, and first output data addresses in the first task descriptor are modified to second output data addresses, respectively. The first input data address is a cache address of input data of the multi-core neural network processor, the second input data address is a cache address of the input data of the selected processor. While, the first output data address is a cache address of output data of the multi-core neural network processor, and the second output data address is a cache address of the output data of the selected processor.

In the multi-core multi-batch mode, a plurality of batches can be processed by the plurality of cores in parallel. In the descriptor of the NNP cluster, data_in_addr and data_out_addr are an input data address and an output data address of the first subtask in the whole NNP cluster task, respectively. In the case of multiple batches, different subtasks are distributed to each NNP, so that the input data address and the output data address of the subtasks in each NNP need to be modified. For example, referring to FIG. 4, when batch_size=4, a modification mode of the input data address data_in_addr of the descriptor of each NNP is shown. As shown in FIG. 4, when one task of the NNP cluster has 8 input data buffers and batch size=4, two input data buffers are distributed to each batch, and corresponding to two subtasks, respectively. When the task of the NNP cluster needs to report interrupts to a certain extent, the NNP cluster needs to be regarded as a whole, so that the buffers or the subtasks need to be distributed to the NNP according to a sequence of the subtasks. The buffers buffer0 and buffer4 are distributed to the NNP NNP0, the buffers buffer1 and buffer5 are distributed to the NNP NNP1, the buffers buffer2 and buffer6 are distributed to the NNP NNP2, and the buffers buffer3 and buffer7 are distributed to the NNP NNP3.

The plurality of cores can jointly complete different subtasks of the same NNP cluster, and cooperatively complete the task of the whole NNP cluster through the above ways under the multi-core multi-batch mode, so that the running time of the task of the NNP cluster can be greatly reduced.

Step S204, configuring each second task descriptor to a corresponding selected processor, and starting each selected processor to process a corresponding subtask.

The main control unit can directly configure the second task descriptor that has modified to a corresponding NNP through a load store instruction, and finally start the corresponding NNP to start working and process the corresponding subtask.

In an embodiment of the present disclosure, the main control unit is configured to perform effective coordination control on each single-core neural network processor, integrally receive information of the task to be processed that is sent from the DMA module, perform uniform analysis and task distribution on the information, to obtain information of each subtask, and then configure the information of these subtasks to corresponding single-core neural network processors for processing. In this way, the main control unit performs unified scheduling and management on each single-core neural network processor, so that repeated configuration, missing configuration and non-uniform configuration of tasks can be avoided, to fully exert computational performance of the multi-core neural network processor.

Furthermore, in the multi-core multi-batch mode, each NNP processes a different batch or a different subtask. In this way, an input feature map of each NNP is different, and the parameters used in the processing process are the same, so that the parameters can be shared among the plurality of NNP within the NNP cluster. In the multi-core single-batch mode, an input fragment of each NNP is different, and the parameters used in the processing process are the same, so that the parameters can also be shared among the plurality of NNP within the NNP cluster.

In an embodiment of the present disclosure, each single-core neural network processor can also include a sharing parameter transport module (that is, ewdma) configured to convey sharing parameters from outside the NNP core into the data memory inside the NNP core.

After the subtasks distributed to each single-core neural network processor are determined, one of the selected processors is selected as a main core processor, and the other selected processors except the main core processor, are taken as slave core processors. After each of the selected processors starts to process the corresponding subtask, the parameters read by the main core processor are shared to each of the slave core processors.

Figure 5:
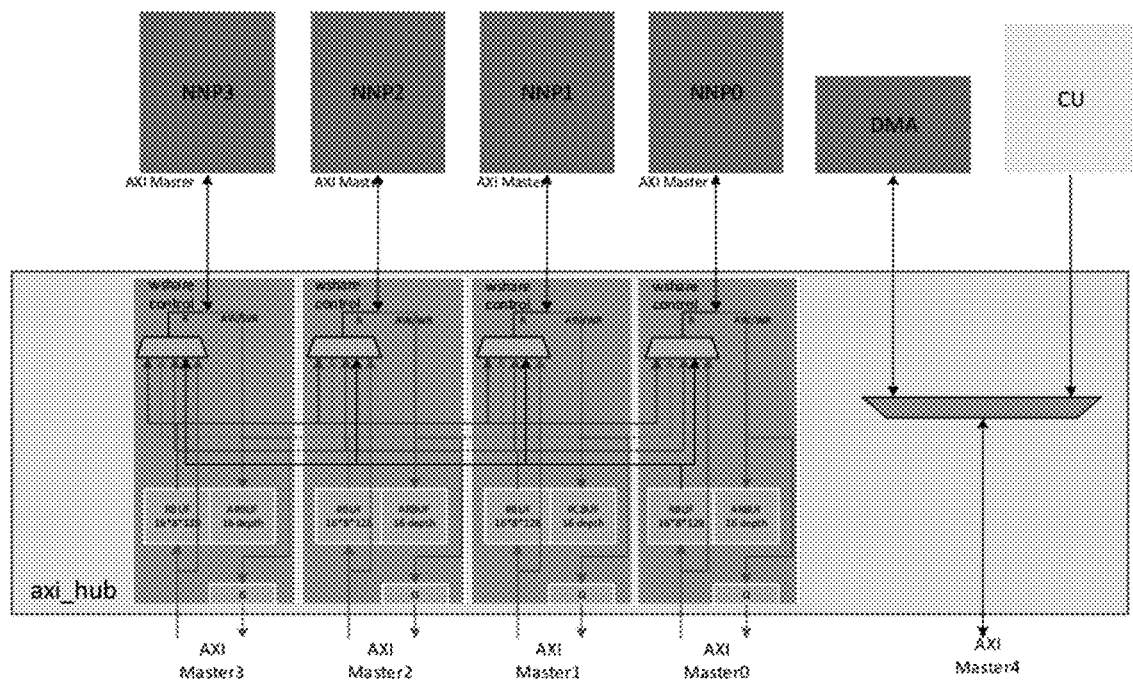
FIG. 5 is a schematic diagram of sharing parameters among the multi-core neural network processors according to an embodiment of the present disclosure.

FIG. 5 is a schematic diagram of sharing parameters among the multi-core neural network processors according to an embodiment of the present disclosure.

Referring to FIG. 5, The AXI Hub in the multi-core neural network processor is also configured to implement parameter sharing among the plurality of NNPs. In the AXI Hub, the parameter sharing logic module (that is, a wsharelogic of FIG. 5) corresponding to each NNP, is configured to determine parameter sharing logics among the multi-core NNPs, and process control thereof. The parameter sharing logic module includes a command cache (that is, an ARBUF of FIG. 5) configured to cache parameter reading commands (that is, ewdma reading commands) sent by the NNP, and a data cache (that is, a RBUF of FIG. 5) configured to cache data that is read back by the parameter sharing logic module of the main core processor.

After the AXI Hub receives a command sent from any NNP, the parameter sharing logic module corresponding to the NNP first checks whether the command is the parameter reading command, and a current mode is a multi-core mode (including the multi-core multi-batch mode and the multi-core single-batch mode).

If the command is not the parameter reading command, or the current mode is not the multi-core mode, the command can be directly sent to an external AXI bus.

If the command is the parameter reading command, and the current mode is the multi-core mode, it is further determined whether the NNP sending the command is the main core processor.

If the NNP is the main core processor, caching the parameter reading command into the command cache under the condition that the command cache in the parameter sharing logic module corresponding to the NNP has a space, and setting a flag bit (data_ready) corresponding to the main core processor as a first value to indicate that data is not ready; after commands preceding the parameter reading command in the command cache are all sent out, the parameter reading command can be sent to the external AXI bus.

If the NNP is the slave core processor, caching the parameter reading command into the command cache, when the command cache in the parameter sharing logic module corresponding to the NNP has a space, and setting the flag bit corresponding to the slave core processor as a second value. It should be noted, at this time, that the parameter reading command can't be sent to the external AXI bus.

Specific values of the first value and the second value can be set according to actual conditions, and preferably, the first value can be set to 0, and the second value can be set to 1.

After the data is read back from the specified memory, the parameter sharing logic module of the NNP corresponding to the data first determines whether the data that has read back is data corresponding to a reading command of the parameter sharing logic module, and whether the current mode is the multi-core mode.

If the data that has read back is not the data corresponding to the reading command of the parameter sharing logic module, or the current mode is not the multi-core mode, the data can be directly sent to the NNP corresponding to the data that has read back.

If the data that has read back is the data corresponding to the reading command of the parameter sharing logic module, and the current mode is the multi-core mode, it can be determined that the data is the parameters needed to be shared among the NNPs, at this time, caching the parameters that have read back in the data cache of the parameter sharing logic module corresponding to the main core processor. After the parameter is completely cached, the flag bit corresponding to the main core processor is set as the second value.

When the flag bit corresponding to each selected processor is the second value, reading the parameter from the data cache of the parameter sharing logic module corresponding to the main core processor, and broadcasting the parameter to each selected processor to implement parameter sharing thereamong.

Through the above process, in the case of a multi-core architecture and in the multi-core multi-batch mode, the present disclosure can implement parameters sharing and reduce a bandwidth of the specified memory; while, the present disclosure can cooperatively complete the same model under the multi-core single-batch mode, to greatly reduce the running time of the model, and implement parameters sharing between the fragments, so as to reduce the bandwidth of the specified memory.

It should be understood that sequence numbers of the steps in the above embodiments do not imply orders to be performed, sequences to perform each process shall be determined by its functions and internal logics, rather than to constitute any limitations to perform the embodiments of the present disclosure.

Figure 6:
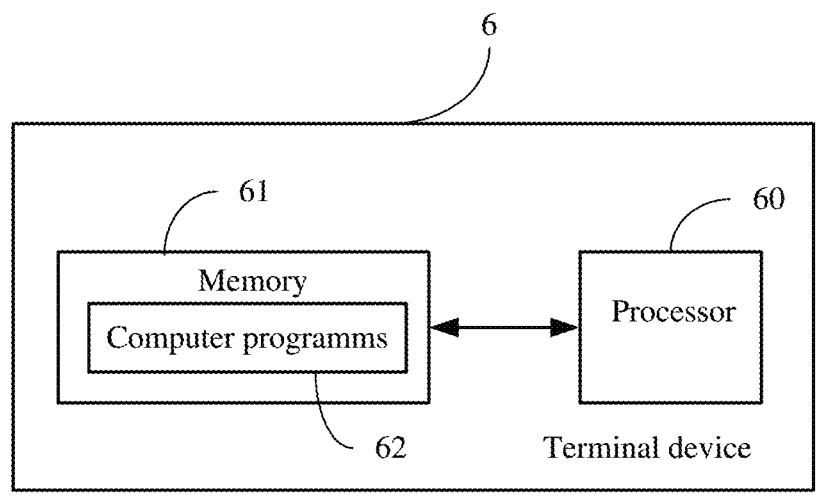
FIG. 6 is a block diagram of a terminal device according to an embodiment of the present disclosure.

FIG. 6 is a block diagram of a terminal device according to an embodiment of the present disclosure, and only shows parts relevant to the embodiment of the present disclosure for convenience illustration.

Referring to FIG. 6, the terminal device 6 includes: a processor 60, a memory 61 and computer programs 62 stored in the memory 61 and performed by the processor 60. The processor 60 is the above multi-core neural network processor and configured to perform the computer programs 62 to implement steps of the control method of each neural network processor above mentioned, for example, the steps S201-S204 shown in FIG. 2.

Specifically, the computer program 62 can be segmented into one or more modules/units that are stored in the memory 61 and performed by the processor 60 to implement the present disclosure. The one or more modules/units can be a series of computer program instruction segments capable of performing specific functions, which are configured to describe performion of the computer programs 62 in the terminal device 6.

The terminal device 6 can be a computing device such as a desktop computer, a notebook, a handheld computer, a smart phone and a server. It can be understood for an ordinary skilled person in the art that: FIG. 6 is only an example of the terminal device 6, but is not limited thereto, the terminal device 6 can include more or less components than illustrated in FIG. 6, or some combination of components, or different components. For example, the terminal device 6 can also include input/output devices, network access devices, buses, etc.

The memory 61 can be an internal storage unit within the terminal device 6, such as a hard disk or a memory of the terminal device 6. The memory 61 can also be an external storage device of the terminal device 6, such as a plug-in hard disk, a Smart Media Card (SMC), a Secure Digital (SD) Card, and a Flash Card, etc. equipped on the terminal device 6. Furthermore, the memory 61 can also include both an internal storage unit of the terminal device 6 and an external storage device. The memory 61 is configured to store computer programs and other programs and data required by the terminal device 6, and temporarily store data that has been output or to be output.

The terminal device 6 can further include a communication module, which can provide a communication solution applied to a network device, such as a wireless local area networks (WLAN) (such as a Wi-Fi Network), a Bluetooth, a Zigbee, a mobile communication network, a global navigation satellite system (GNSS), a frequency modulation (FM), a near field communication (NFC), and an infrared technology (Infrared, IR). The communication module can be one or more devices integrated with at least one communication processing module, and can include an antenna with only one array element thereof, or an antenna array with a plurality of array elements thereof. The communication module can be configured to receive electromagnetic waves through the antenna, perform frequency modulation and filtering processing on electromagnetic wave signals, and send processed signals to the processor; and also receive the signals to be transmitted from the processor, perform frequency modulation and amplification on the signals to be transmitted, and then convert the signals that have performed frequency modulation and amplification into electromagnetic waves through the antenna to radiate out.

The terminal device 6 can further include a power management module configured to receive the input of an external power supply, a battery and/or a charger to supply power to the processor, the memory and the communication module.

The terminal device 6 can further include a display module configured to display information input by a user or information provided to the user. The display module can include a display panel that can optionally be configured in a form of a liquid crystal display (LCD), and an organic light emitting diode (OLED), etc. Furthermore, the display panel can be covered by a touch panel, and when the touch panel detects a touch operation thereon or nearby, the touch panel transmits signals of the touch operation to the processor, to determine a type of touch events, and then the processor provides a corresponding visual output on the display panel according to the type of the touch events.

An ordinary skilled person in the art can be clearly understood that: for convenient and simple description, the above functional units and modules are only split to illustrate with examples. In a practical application, different functional units and modules can be assigned to implement the above functions according to needs, that is, internal structures of the apparatus can be split into different functional units or modules to complete all or part of the functions described above. Each functional unit or each module in embodiments of the present disclosure can be integrated in a processing unit, or each unit can physically exist separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method, which is not repeated here.

In the above embodiments, the description of each embodiment has its own emphasis, and parts without detailed description in one embodiment can be referred to relevant description of other embodiments.

An ordinary skilled person in the art can be aware that various illustrative units and algorithm steps described in connection with the embodiments disclosed herein can be implemented as electronic hardware or combinations of computer software and electronic hardware. Whether these functions are performed in hardware or software modes depends on a specific application of the technical solution and design constraints. Professionals can use different methods for each specific application to achieve the functions described, but such implementation should not be considered outside the scope of this application.

It should be understood that the disclosed apparatus/terminal equipment and method in the embodiments provided by the present disclosure can be implemented in other ways. For example, the embodiments of the apparatus/terminal equipment described above are merely schematic; for example, the splitting of the modules or units is merely a splitting of logical functions, which can also be realized in other ways; for example, multiple units or components can be combined or integrated into another system, or some features can be ignored or not implemented. On the other hand, the coupling, direct coupling or communication connection shown or discussed can be achieved through some interfaces, indirect coupling or communication connection between devices or units can electrical, mechanical or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

In addition, each functional unit in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

A computer program product according to an embodiment of the present disclosure is configured to be performed by a neural network processor to implement steps of the above control method of any neural network processor.

The integrated modules/units can be stored in a computer readable memory if implemented in the form of software program modules and sold or used as a separate product. Based on this understanding, all or part of the steps in the method of the above embodiment in the present disclosure can be implemented by computer program instructions of relevant hardware which can be stored in a computer readable storage medium, the computer program can be performed by the processor to implement the steps in the various methods of the above embodiments. Furthermore, the computer program includes computer program codes, which can be in a form of source codes, object codes, performable files or some intermediate forms, etc. The computer readable medium can include: any entities or devices capable of carrying the computer program codes, a recording medium, a U disk, a mobile hard disk drive, a diskette or a CD-ROM, a computer Memory, a Read-Only Memory (ROM), a Random Access Memory (RAM), an electrical carrier signal, a telecommunication signal and a software distribution medium, etc. It should be noted that content contained in the computer readable storage medium can be added or reduced as appropriate to the requirements of legislation and patent practice within the jurisdictions, for example, in some jurisdictions, in accordance with legislation and patent practice, computer readable storage medium do not include electrical carrier signals and telecommunications signals.

The above embodiments are used only to describe, but not limited to, the technical solution of the present disclosure. Although the features and elements of the present disclosure are described as embodiments in particular combinations, an ordinary skilled person in the art should understand that: each feature or element can be used alone or in other various combinations within the principles of the present disclosure to the full extent indicated by the broad general meaning of the terms in which the appended claims are expressed. Any variation or replacement made by one of ordinary skill in the art without departing from the spirit of the present disclosure shall fall within the protection scope of the present disclosure.

What is claimed is:

1. A control method of a neural network processor applied to a multi-core neural network processor, the multi-core neural network processor comprising N single-core neural network processors, wherein N is an integer greater than 1, the method comprising:

obtaining a first task descriptor, the first task descriptor configured to describe information of a task distributed to the neural network processor;

analyzing the first task descriptor, and then determining subtasks distributed to each selected processor according to an analysis result thereof, wherein the selected processor is a processor that is selected from the N single-core neural network processors and configured to perform the task;

modifying the first task descriptor to obtain a second task descriptor corresponding to each selected processor, the second task descriptor configured to describe information of a subtask distributed to the selected processor; and configuring each second task descriptor to a corresponding selected processor, and starting each selected processor to process a corresponding subtask; and wherein the step of modifying the first task descriptor, comprises:

if a processing mode indicated in the first task descriptor is a multi-core single-batch mode, modifying a first fragment information address of the first task descriptor to a second fragment information address, wherein the first fragment information address is an address of fragment information of the multi-core neural network processor, and the second fragment information address is an address of fragment information of the selected processor.

2. The method as claimed in claim 1, wherein before modifying the first fragment information address of the first task descriptor to the second fragment information address, the method further comprises:

obtaining a feature map to be processed;

segmenting the feature map, to obtain each fragment of the feature map;

performing fragment distribution according to the number of the selected processors, and determining fragment information of each selected processor; and storing the fragment information of each selected processor to a specified address.

3. The method as claimed in claim 1, wherein the step of modifying the first task descriptor, comprises: if a processing mode indicated in the first task descriptor is a multi-core multi-batch mode, modifying a first input data address of the first task descriptor to a second input data address, wherein the first input data address is a cache address of input data of the multi-core neural network processor, and the second input data address is a cache address of input data of the selected processor; and modifying a first output data address of the first task descriptor to a second output data address, wherein the first output data address is a cache address of output data of the multi-core neural network processor, and the second output data address is a cache address of output data of the selected processor.

4. The method as claimed in claim 1, wherein after determining the subtasks distributed to each single-core neural network processor, the method further comprises:

selecting one of the selected processors as a main core processor, and taking the other selected processors except the main core processor, as slave core processors;

after starting each selected processor to process the corresponding subtask, the method further comprises:

sharing the parameters read by the main core processor to each of the slave core processors.

5. The method as claimed in claim 4, wherein the step of sharing the parameters read by the main core processor to each of the slave core processors, comprises:

if a parameter reading command sent by the main core processor is received, caching the parameter reading command into a command cache corresponding to the main core processor, and setting a flag bit corresponding to the main core processor as a first value; sending the parameter reading command to a bus, after commands preceding the parameter reading command are all sent out;

if a parameter reading command sent by any slave core processor is received, caching the parameter reading command into a command cache corresponding to the slave core processor, and setting a flag bit corresponding to the slave core processor as a second value;

caching the parameter that is read back, into a data cache corresponding to the main core processor, and setting a flag bit corresponding to the main core processor as the second value; and when the flag bit corresponding to each selected processor is the second value, reading the parameter from the data cache corresponding to the main core processor, and broadcasting the parameter to each selected processor.

* * * * *